(12) United States Patent
Iba

(10) Patent No.: US 8,696,146 B2
(45) Date of Patent: Apr. 15, 2014

(54) DOOR MIRROR

(75) Inventor: Ryosuke Iba, Fujieda (JP)

(73) Assignee: Murakami Corporation, Shizuoka (JP)

( * ) Notice: Subject to any disclaimer, the term of this patent is extended or adjusted under 35 U.S.C. 154(b) by 88 days.

(21) Appl. No.: 13/560,084

(22) Filed: Jul. 27, 2012

(65) Prior Publication Data

US 2013/0070354 A1   Mar. 21, 2013

(30) Foreign Application Priority Data

Sep. 20, 2011   (JP) .................................. 2011-205211

(51) Int. Cl.
*G02B 7/182* (2006.01)
*B60R 1/06* (2006.01)

(52) U.S. Cl.
USPC ............................. 359/841; 359/872; 359/877

(58) Field of Classification Search
USPC ........................... 359/841, 872, 874, 876, 877
See application file for complete search history.

(56) References Cited

U.S. PATENT DOCUMENTS

| | | | | |
|---|---|---|---|---|
| 4,693,571 A | * | 9/1987 | Kimura et al. ................. | 359/874 |
| 4,701,037 A | * | 10/1987 | Bramer ......................... | 359/874 |
| 4,815,837 A | * | 3/1989 | Kikuchi et al. ................ | 359/874 |
| 4,915,493 A | * | 4/1990 | Fisher et al. ................... | 359/874 |
| 4,930,370 A | * | 6/1990 | Yoshida ......................... | 74/502.1 |
| 5,583,703 A | * | 12/1996 | Lang et al. ..................... | 359/877 |
| 5,621,577 A | * | 4/1997 | Lang et al. ..................... | 359/872 |
| 5,724,200 A | * | 3/1998 | Mochizuki ..................... | 359/877 |
| 5,896,238 A | * | 4/1999 | Hubscher et al. .............. | 359/877 |
| 6,132,052 A | * | 10/2000 | Huizenga et al. .............. | 359/877 |
| 6,213,612 B1 | * | 4/2001 | Schnell et al. ................. | 359/877 |
| 6,357,885 B2 | * | 3/2002 | Sakamoto et al. ............. | 359/877 |
| 7,137,717 B2 | * | 11/2006 | Ohashi ........................... | 359/877 |

FOREIGN PATENT DOCUMENTS

JP   2003-285690   10/2003

* cited by examiner

*Primary Examiner* — Ricky D Shafer
(74) *Attorney, Agent, or Firm* — Greenblum & Bernstein P.L.C.

(57) ABSTRACT

A partition wall for partitioning a mirror accommodating space for accommodating a mirror holder and a mirror surface angle adjusting unit, and a harness accommodating space for accommodating a harness are provided in a mirror housing of an electric door mirror. An opening for exposing the terminal part of the mirror surface angle adjusting unit to the harness accommodating space, and insertion through-holes located to surround the opening and through which screws passes from the harness accommodating space toward the mirror surface angle adjusting unit respectively are formed in the partition wall. Further, reinforcing tube portions surrounding the insertion through-holes and protruding to the harness accommodating space are installed in the partition wall.

4 Claims, 5 Drawing Sheets

DOOR MIRROR

CROSS-REFERENCE TO RELATED APPLICATIONS

This application claims priority to Japanese Patent Applications No. 2011-205211 filed on Sep. 20, 2011, the entire contents of which are incorporated by reference herein.

BACKGROUND OF THE INVENTION

1. Field of the Invention

The present invention relates to a door mirror applied to a vehicle such as a car.

2. Related Background Art

In the related technical field, a door mirror includes a mirror module, a mirror angle adjusting unit (hereinafter, a mirror surface angle adjusting unit), and a visor for accommodating the mirror module and the mirror surface angle adjusting unit (hereinafter, a mirror housing) (see, for example, Patent Document 1). In the door mirror discussed in Patent Document 1, a harness connecting part (hereinafter, a terminal part) to which a power supply connector of a harness for supplying external electric power is connected is provided on a rear surface of the mirror surface angle adjusting unit. Further, a partition wall for partitioning an interior space of the mirror housing into a first space on a front side and a second space on a rear side and fixing the mirror surface angle adjusting unit accommodated in the second space is provided in the mirror housing. An opening for exposing the terminal part of the mirror surface angle adjusting unit to the first space is formed in the partition wall. Accordingly, after the mirror surface angle adjusting unit is accommodated in the second space, the harness may be connected to the mirror surface angle adjusting unit.

[Patent Document 1] Japanese Patent Application Laid-Open No. 2003-285690

SUMMARY OF THE INVENTION

Problems that the Invention is to Solve

In the above-described door mirror according to the related art, it is preferable that the opening of the partition wall of the mirror housing is formed large. If the opening becomes larger, for example, the terminal part and the power supply connector become larger according to the size of the opening, and many terminals are concentrated on one set of a terminal part and the power supply connector, thereby making it possible to reduce the number of power supply connectors and enhance assembling efficiency. Further, one type of mirror housing can be applied to various mirror surface angle adjusting units having terminal parts whose shapes and sizes are different from each other, and a mirror housing can be used in a plurality types of door mirrors commonly.

The present invention is directed to a door mirror which can enlarge an opening of a partition wall of a mirror housing.

Means to Solve the Problems

An exemplary embodiment of the present invention provides a door mirror including: a mirror holder to which a mirror is fixed; a mirror surface angle adjusting unit for adjusting an angle of the mirror holder; a mirror housing accommodating the mirror holder and the mirror surface angle adjusting unit; and a plurality of fastening components fixing the mirror surface angle adjusting unit within the mirror housing, wherein a terminal part to which a power supply connector of a harness supplying external electric power is connected, and a plurality of fixing parts located to surround the terminal part and to which the plurality of fastening components is coupled are provided on a rear side of the mirror surface angle adjusting unit, a partition wall partitioning an interior space of the mirror housing into a first space on a front side and a second space on a rear side is provided in the mirror housing, and an opening exposing the terminal part of the mirror surface angle adjusting unit accommodated within the second space to the first space, a plurality of insertion through-holes located to surround the opening and through which the plurality of fastening components fixed to the plurality of fixing parts passes from the first space, and a plurality of reinforcing tube portions surrounding the respective insertion through-holes and protruding to the first space are provided on the partition wall.

According to the door mirror of the present invention, the fastening components are coupled to the fixing parts of the mirror surface angle adjusting unit accommodated in the second space of the mirror housing through the insertion through-holes of the partition wall of the mirror housing respectively and the mirror surface angle adjusting unit is fixed within the second space. In this case, the terminal part of the mirror surface angle adjusting unit is exposed to the first space via the opening of the partition wall. A plurality of reinforcing tube portions is formed to surround the respective insertion through-holes at circumferential portions of the opening, and the reinforcing tube portions protrude to the first space. Accordingly, a space for accommodating the fastening components is secured inside the reinforcing tube portions, the peripheries of the reinforcing tube portions are reinforced, and thus the circumferential portions of the opening are reinforced. In this way, as the circumferential portions of the opening are reinforced by the reinforcing tube portions, strength of the partition wall is not lowered but the opening can be formed larger, accomplishing various merits accompanied by the large size of the opening. For example, a terminal part and a power supply connector become larger according to the size of the opening, and many terminals are concentrated on one set of the terminal part and the power supply connector, thereby making it possible to reduce the number of power supply connectors and enhance assembling efficiency. Further, one type of mirror housing can be applied to various mirror surface angle adjusting units having terminal parts whose shapes and sizes are different from each other, and thus a mirror housing can be commonly used in a plurality types of door mirrors.

A reinforcing rib protruding to the first space and connected to one of the reinforcing tube portions is further provided on the partition wall. In this case, since the reinforcing tube portions are further reinforced by the reinforcing ribs, the circumferential portions of the opening can be reinforced more firmly.

Further, the reinforcing rib is further connected to another one of the reinforcing tube portions. In this case, since portions between the reinforcing tube portions are reinforced by the reinforcing ribs, the circumferential portions of the opening can be reinforced more firmly.

In addition, the door mirror further includes: a door mirror base fixed to a vehicle; and a storage unit mounted to a pedestal part of the door mirror base from the upper side, supporting the mirror housing, and allowing the mirror housing to be foldable so as to face a side window of the vehicle. A storage unit accommodating part swelling toward the first space to be located above the pedestal part of the door mirror base and accommodating the storage unit is provided on the partition wall, and the reinforcing rib is further connected to the storage unit accommodating part. In this case, the reinforcing tube portions are connected to the storage unit accommodating part with the reinforcing ribs being interposed therebetween. The storage unit accommodating part is designed to have high strength because a load applied to the mirror housing by a wind pressure while the vehicle is travelling is concentrated on the storage unit accommodating part. In this way, as the reinforcing tube portions are connected to the storage unit accommodating part designed to have high strength with the reinforcing ribs being interposed therebetween, the reinforcing tube portions are reinforced more firmly, and thus the circumferential portions of the opening can be reinforced more firmly.

Advantage of the Invention

According to a door mirror of the present invention, an opening of a partition wall of a mirror housing can be enlarged.

DESCRIPTION OF THE PREFERRED EMBODIMENTS

Hereinafter, an exemplary embodiment of a door mirror according to the present invention will be described in detail with reference to the accompanying drawings. In the following, the front and rear sides of the door mirror correspond to the front and rear sides of the vehicle to which the door mirror is attached.

Figure 1:
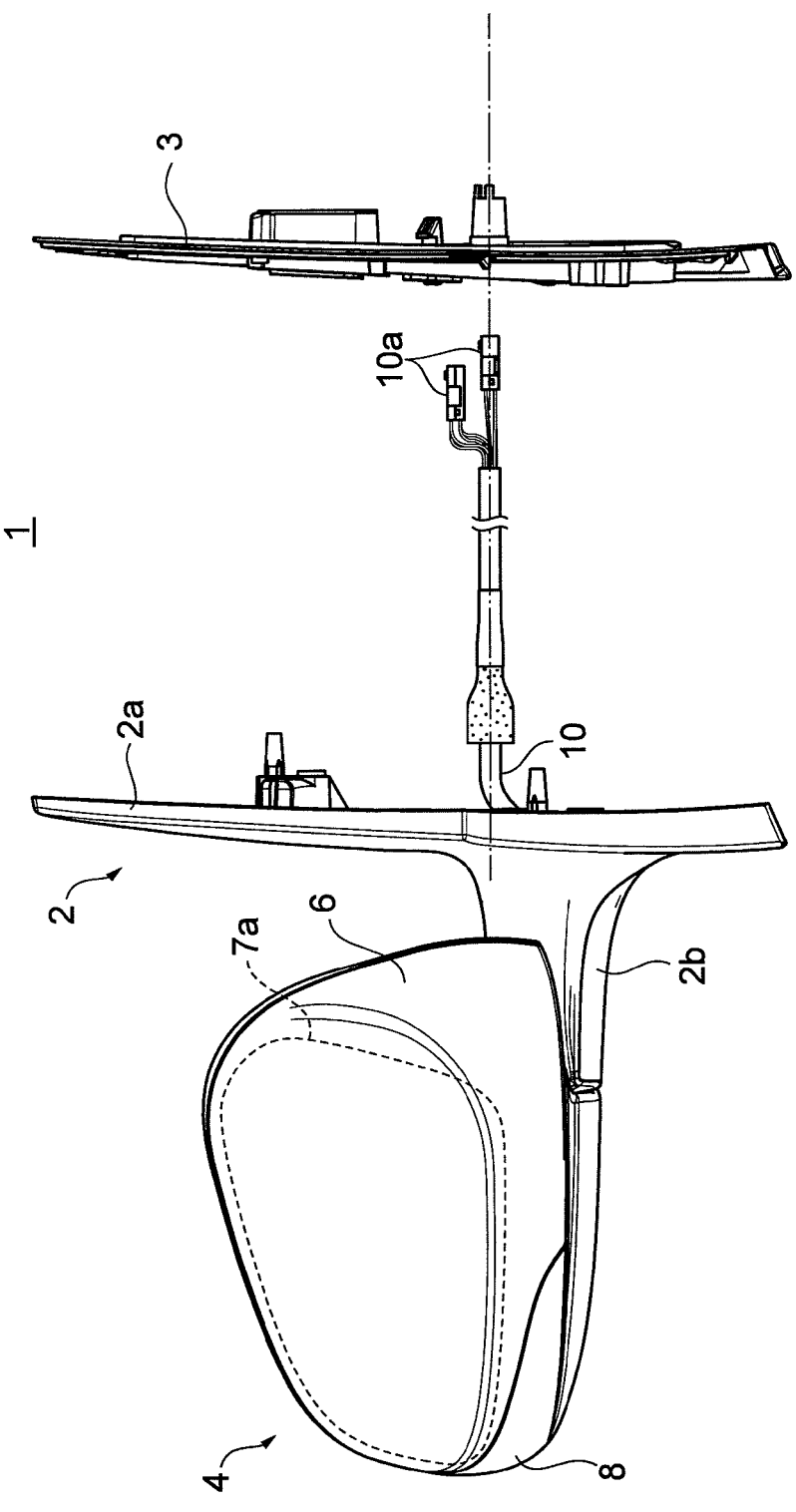
FIG. 1 is a front view illustrating a door mirror according to an exemplary embodiment of the present invention.

As illustrated in FIG. 1, an electric door mirror 1 mainly includes a door mirror base 2 coupled to a front door of the vehicle with a bolt, a gasket 3 disposed between a base body 2a of the door mirror base 2 and the front door, and a door mirror main body 4 rotatably mounted to a pedestal part 2b of the door mirror base 2.

Figure 2:
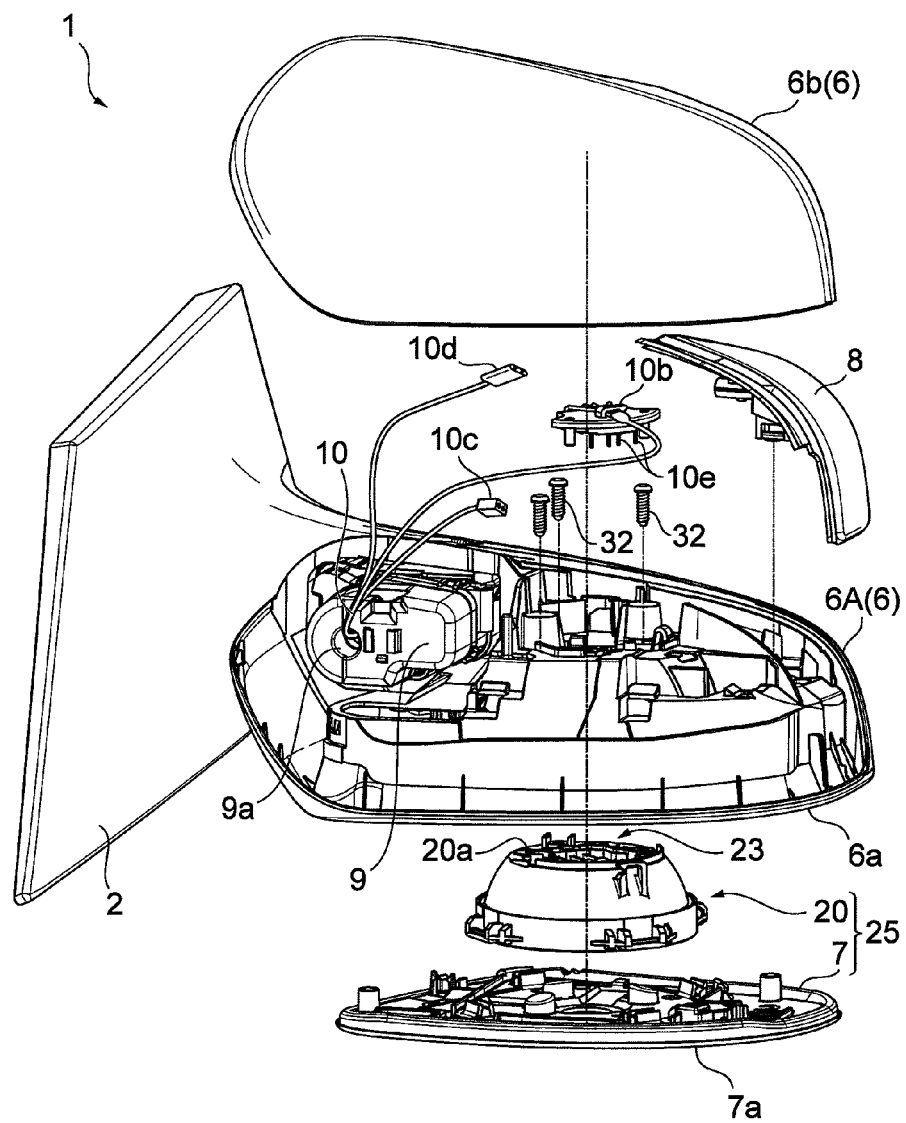
FIG. 2 is an exploded perspective view of the door mirror.

As illustrated in FIG. 2, the door mirror main body 4 includes a mirror holder 7 disposed on a mirror exposing opening 6a side of a mirror housing 6, a mirror surface angle adjusting unit 20 fitted with a rear surface of the mirror holder 7 to which a mirror 7a is fixed on an outer surface thereof to adjust an angle of the mirror holder 7, screws 32 which are fastening components for fixing the mirror surface angle adjusting unit 20 into the mirror housing 6, an electric storage unit 9 mounted to the pedestal part 2b of the door mirror base 2 from the upper side, supporting the mirror housing 6 and allowing the mirror housing 6 to be foldable so as to face a side face of the vehicle, and a turn lamp unit 8 fixed to the mirror housing 6.

A harness 10 is provided in the electric door mirror 1 and wired around in the door mirror base 2 and the door mirror main body 4 to supply electric power to a motor in the mirror surface angle adjusting unit 20, a motor in the electric storage unit 9, and a lamp in the turn lamp unit 8, respectively. A connector 10b connected to the mirror surface angle adjusting unit 20, a connector 10c connected to the electric storage unit 9, and a connector 10d connected to the turn lamp unit 8 are provided at one end of the harness 10. A connector 10a for connection to a wire in the vehicle is provided at an opposite end of the harness 10 (see FIG. 1). The opposite end of the harness 10 is extracted toward the vehicle through the base body 2a of the door mirror base 2 and the gasket 3.

The mirror housing 6 includes a housing main body 6A for accommodating the mirror surface angle adjusting unit 20, the electric storage unit 9 and the mirror holder 7, and a cover member 6b located on a front side of the housing main body 6A. The cover member 6b generally has the same color as a body of the vehicle. The electric storage unit 9 is fixed to the housing main body 6A, and has a harness extracting hole 9a through which the harness 10 passes.

Figure 3:
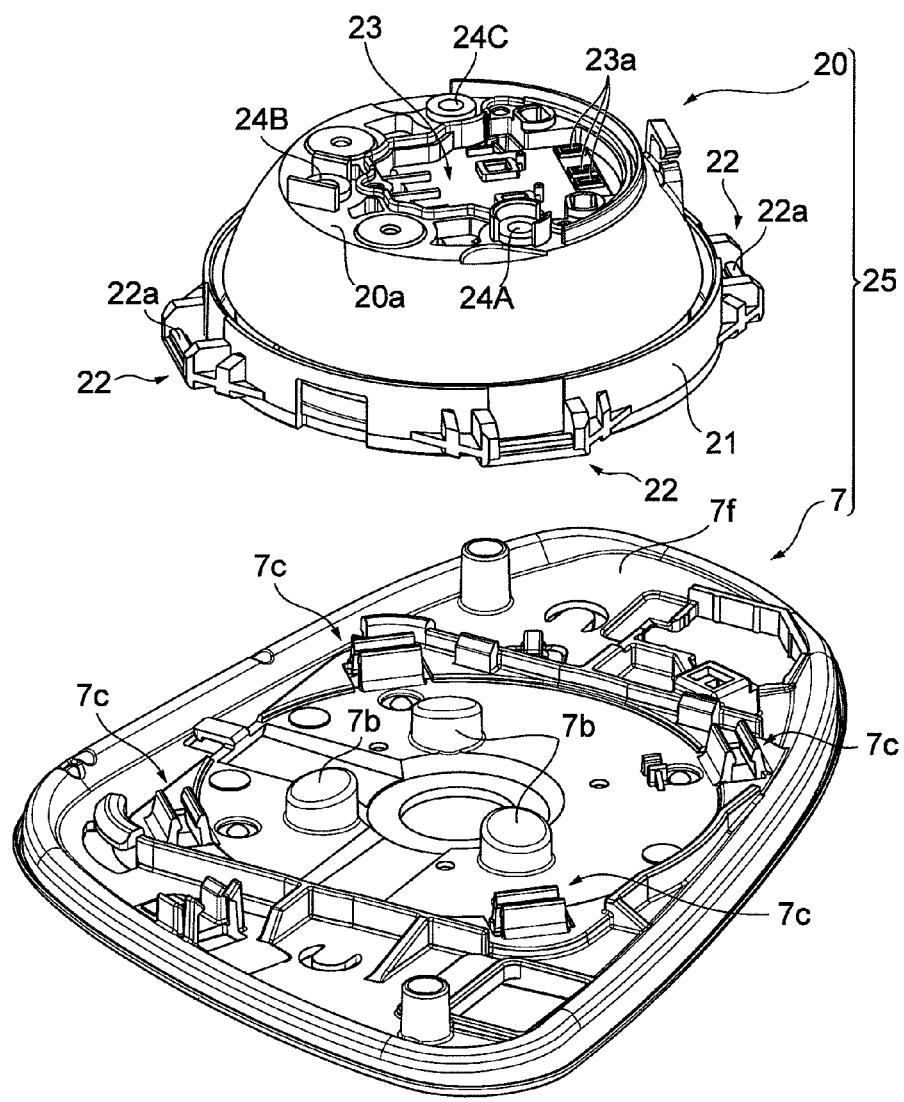
FIG. 3 is a perspective view of a mirror unit assembly.

As illustrated in FIG. 3, four clamp claws 7c protruding to fix the mirror surface angle adjusting unit 20, and three bosses 7b for positioning the mirror surface angle adjusting unit 20 with respect to the mirror holder 7 are formed on a rear surface 7f of the mirror holder 7. Further, at the rear surface 7f of the mirror holder 7, four clamp claws 7c are arranged at equal intervals in a peripheral direction on an outer side of the three bosses 7b.

A housing 21 of the mirror surface angle adjusting unit 20 has a circular outer periphery, and catch portions 22 protruding radially are formed in the housing 21. A catching bar 22a on which the clamp claw 7c of the mirror holder 7 is mounted is installed in each of the catch portions 22. A positioning hole 21a (see FIG. 4) for insertion of the boss 7b of the mirror holder 7 is formed in the housing 21 of the mirror surface angle adjusting unit 20.

A recessed terminal part 23 for connection of the connector 10b of the harness 10 is installed on a rear surface 20a of the mirror surface angle adjusting unit 20, and a female power supply terminal 23a is disposed in the terminal part 23. Meanwhile, a male power supply terminal 10e is disposed in the connector 10b of the harness 10 (see FIG. 2), and the power supply terminal 10e and the power supply terminal 23a are electrically connected to each other.

Four sets of power supply terminals 10e and 23a are provided, two sets of the power supply terminals 10e and 23a connect a first motor (not illustrated) in the mirror surface angle adjusting unit 20 to the harness 10 and the remaining two sets connect a second motor (not illustrated) in the mirror surface angle adjusting unit 20 to the harness 10. Further, the first motor tilts the mirror surface vertically and the second motor tilts the mirror surface horizontally.

Three female screw holes (fixing holes) 24A, 24B, and 24C for coupling the screws 32 are disposed around the recessed terminal part 23. In this way, as the female screw holes 24A, 24B, and 24C are disposed around the terminal part 23, the rear surface 20a of the mirror surface angle adjusting unit 20 can become smaller, which contributes to a small size of the housing 21 of the mirror surface angle adjusting unit 20.

The mirror holder 7 and the mirror surface angle adjusting unit 20 are integrated by a cooperation of the clamp claws 7c and the catching bars 22a, constituting a mirror unit assembly 25.

Figure 4:
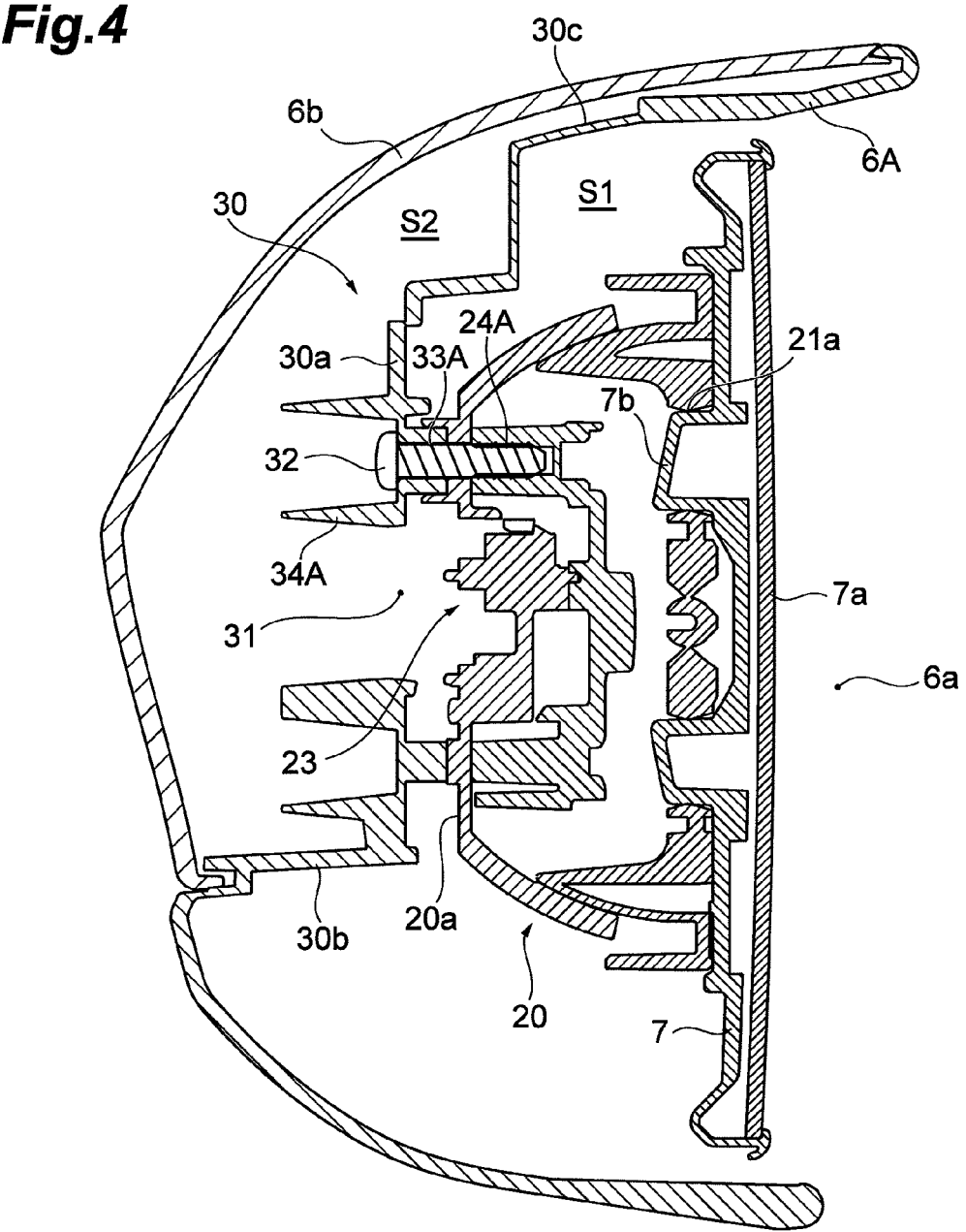
FIG. 4 is a sectional view of the door mirror.
Figure 5:
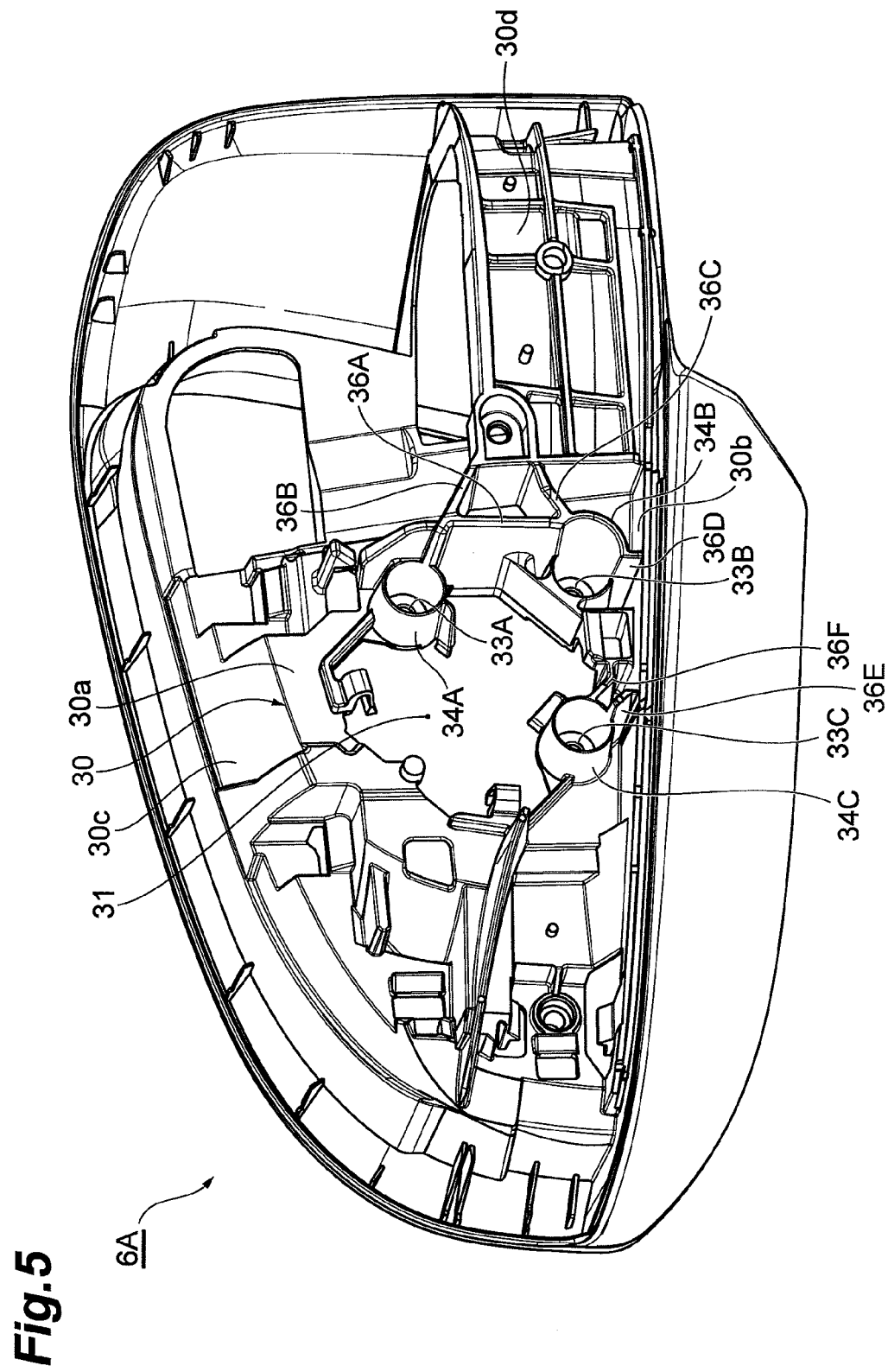
FIG. 5 is a perspective view illustrating a housing main body of a mirror housing.

As illustrated in FIGS. 4 and 5, a partition wall 30 partitioning an interior space of the mirror housing 6 is installed in the housing main body 6A of the mirror housing 6. The partition wall 30 has a main wall portion 30a partitioning the interior space of the mirror housing 6 into front and rear sides, a lower wall portion 30b protruding forward from a lower end of the main wall portion 30a, and an upper wall portion 30c protruding rearward from an upper end of the main wall portion 30a. The rear side of the main wall portion 30a forms a mirror accommodating space S1 (second space) and the front side of the main wall portion 30a forms a harness accommodating space S2 (first space). The mirror unit assembly 25 is accommodated in the mirror accommodating space S1. The harness 10 extracted from the mirror surface angle adjusting unit 20 to the outside of the electric door mirror 1 is accommodated in the harness accommodating space S2, and the harness 10 is wired around in the harness accommodating space S2. Further, the harness accommodating space S2 is defined by the cooperation of the partition wall 30 of the housing main body 6A and the cover member 6b, and is opened in a state where the cover member 6b is not mounted to the housing main body 6A.

As illustrated in FIG. 5, a storage unit accommodating part 30d swelling from the main wall portion 30a toward the harness accommodating space S2 is provided on a vehicle side part of the partition wall 30, and the storage unit accommodating part 30d is located above the pedestal part 2b of the door mirror base 2 and is open-topped. The electric storage unit 9 is accommodated in the storage unit accommodating part 30d from the upper side (see FIG. 2), and is fixed by a screw or the like. Further, a rotary shaft (not illustrated) of the electric storage unit 9 fixed to the storage unit accommodating part 30d is fixed to the pedestal part 2b.

Further, an opening 31 for exposing the terminal part 23 of the mirror surface angle adjusting unit 20 to the harness accommodating space S2 is formed at a substantially central part of the main wall portion 30a of the partition wall 30, and three insertion through-holes 33A, 33B, and 33C through which the screws 32, which are fastening components, are inserted and pass therethrough are formed at circumferential portions of the opening 31. The insertion through-holes 33A, 33B, and 33C are formed at positions corresponding to the above-described female screw holes 24A, 24B, and 24C of the mirror surface angle adjusting unit 20, and as the screws 32 inserted and passing through the insertion through-holes 33A, 33B, and 33C from the harness accommodating space S2 side are coupled to the female screw holes 24A, 24B, and 24C, respectively, the mirror surface angle adjusting unit 20 is fixed to the partition wall 30. The connector 10b of the harness 10 is connected to the terminal part 23 exposed to the harness accommodating space S2 side from the opening 31. Further, the coupling of the screw 32 and the connection of the connector 10b may be easily performed before the cover member 6b is mounted in a state where the harness accommodating space S2 is opened.

Three cylindrical reinforcing tube portions 34A, 34B, and 34C surrounding the insertion through-holes 33A, 33B, and 33C, respectively, and protruding to the harness accommodating space S2 are provided on the main wall portion 30a of the partition wall 30. The insertion through-hole 33A and the reinforcing tube portion 34A, which form a pair, are disposed above the circumference of the opening 31 and near the storage unit accommodating part 30d. The insertion through-hole 33B and the reinforcing tube portion 34B, which form a pair, are disposed below the circumference of the opening 31 and near the storage unit accommodating part 30d. The insertion through-hole 33C and the reinforcing tube portion 34C, which form a pair, are disposed below the circumference of the opening 31 and far away from the storage unit accommodating part 30d.

Reinforcing ribs 36A, 36B, 36C, 36D, 36E, and 36F protruding to the harness accommodating space S2 are provided on the main wall portion 30a of the partition wall 30. The reinforcing rib 36A is connected to the reinforcing tube portion 34A and the reinforcing tube portion 34B. The reinforcing ribs 36B and 36C are connected to the reinforcing rib 36A and the storage unit accommodating part 30d. The reinforcing rib 36D is connected to the reinforcing tube portion 34B and the lower wall portion 30b of the partition wall 30. The reinforcing rib 36E is connected to the reinforcing tube portion 34C and the lower wall portion 30b of the partition wall 30. The reinforcing rib 36F is connected to the reinforcing tube portion 34C.

As described above, the reinforcing tube portions 34A, 34B, and 34C are formed at circumferential portions of the opening 31 to surround the insertion through-holes 33A, 33B, and 33C, respectively, and the reinforcing tube portions 34A, 34B, and 34C protrude toward the harness accommodating space S2. Accordingly, accommodating spaces for the screws 32 are secured inside the reinforcing tube portions 34A, 34B, and 34C, respectively, the peripheries of the reinforcing tube portions 34A, 34B, and 34C are reinforced, and thus the circumferential portions of the opening 31 are reinforced. In this way, as the circumferential portions of the opening 31 is reinforced by the reinforcing tube portions 34A, 34B, and 34C, the opening 31 can be enlarged without lowering a strength of the partition wall 30 and various merits accompanied by the large size of the opening 31 can be accomplished. For example, in the exemplary embodiment, the terminal part 23 and the connector 10b is large-sized to correspond to the opening 31, and the power supply terminals 23a and 10e are concentrated on the terminal part 23 and the connector 10b such that the number of the connector 10b is one, which enhances assembling efficiency. Further, one type of mirror housing 6 can be applied to various mirror surface angle adjusting units having terminal parts whose shapes and sizes are different from each other, and thus the mirror housing 6 can be commonly used in a plurality types of door mirrors.

Further, since the reinforcing tube portions 34A, 34B, and 34C are further reinforced by the reinforcing ribs 36A to 36F, the circumferential portions of the opening 31 can be reinforced more firmly.

In addition, since a portion between the reinforcing tube portion 34A and the reinforcing tube portion 34B is reinforced by the reinforcing rib 36A connected to the reinforcing tube portion 34A and the reinforcing tube portion 34B, the circumferential portions of the opening 31 can be reinforced more firmly.

Further, the reinforcing rib 36A is further connected to the storage unit accommodating part 30d by the reinforcing rib 36B and the reinforcing rib 36C. The storage unit accommodating part 30d is designed to have high strength because a load applied to the mirror housing 6 by a wind pressure while the vehicle is travelling is concentrated on the storage unit accommodating part 30d. In this way, as the reinforcing tube portions 34A and 34B are connected to the storage unit accommodating part 30d designed to have high strength with the reinforcing ribs 36A, 36B, and 36C being interposed therebetween, the reinforcing tube portions 34A and 34B are reinforced more firmly. In addition, since the reinforcing tube portions 34A and 34B are disposed near the storage unit accommodating part 30d, the reinforcing tube portions 34A and 34B are reinforced more firmly. For this reason, the circumferential portions of the opening 31 can be reinforced more firmly.

Further, the reinforcing rib 36D is connected to the reinforcing tube portion 34B and the lower wall portion 30b of the partition wall 30, and the reinforcing rib 36E is connected to the reinforcing tube portion 34C and the lower wall portion 30b of the partition wall 30. In this way, the reinforcing tube portions 34B and 34C provided on the main wall portion 30a of the partition wall 30 are connected to the lower wall portion 30b of the partition wall 30 and thus are reinforced more firmly. In addition, since the reinforcing tube portions 34B and 34C are disposed on a lower side, that is, on a side near the lower wall portion 30b of the partition wall 30, the reinforcing tube portions 34B and 34C are fixed more firmly. For this reason, the circumferential portions of the opening 31 can be reinforced more firmly.

Although the exemplary embodiment of the present invention has been described until now, the present invention is not necessarily limited to the above-described exemplary embodiment but may be variously modified without departing from the essentials of the present invention. For example, the cross-sectional shapes of the reinforcing tube portions 34A, 34B, and 34C are not limited to circular shapes, but reinforcing tube portions having various cross-sectional shapes such as polygonal shapes may be employed properly. Further, the fastening components for fixing the mirror surface angle adjusting unit 20 within the mirror housing 6 are not limited to the screws 32, but driving fit pins may be employed as the fastening components. In addition, the number of the fastening components may be properly changed according to a sought strength, and the number of reinforcing tube portions may be properly changed accordingly.

What is claimed is:

1. A door mirror comprising:
 a mirror holder to which a mirror is fixed;
 a mirror surface angle adjusting unit for adjusting an angle of the mirror holder;
 a mirror housing accommodating the mirror holder and the mirror surface angle adjusting unit; and
 a plurality of fastening components fixing the mirror surface angle adjusting unit within the mirror housing,
 wherein a terminal part to which a power supply connector of a harness supplying external electric power is connected, and a plurality of fixing parts located to surround the terminal part and to which the plurality of fastening components is coupled are provided on a rear side of the mirror surface angle adjusting unit,
 a partition wall partitioning an interior space of the mirror housing into a first space on a front side and a second space on a rear side is provided in the mirror housing, and
 an opening exposing the terminal part of the mirror surface angle adjusting unit accommodated within the second space to the first space, a plurality of insertion through-holes located to surround the opening and through which the plurality of fastening components fixed to the plurality of fixing parts passes from the first space, and a plurality of reinforcing tube portions surrounding the respective insertion through-holes and protruding to the first space are provided on the partition wall.

2. The door mirror according to claim 1, wherein a reinforcing rib protruding to the first space and connected to one of the reinforcing tube portions is further provided on the partition wall.

3. The door mirror according to claim 2, wherein the reinforcing rib is further connected to another one of the reinforcing tube portions.

4. The door mirror according to claim 2, further comprising:
 a door mirror base fixed to a vehicle; and
 a storage unit mounted to a pedestal part of the door mirror base from an upper side, supporting the mirror housing, and allowing the mirror housing to be foldable so as to face a side face of the vehicle,
 wherein a storage unit accommodating part swelling toward the first space to be located above the pedestal part of the door mirror base and accommodating the storage unit is provided on the partition wall, and
 the reinforcing rib is further connected to the storage unit accommodating part.

* * * * *